A. G. BAKER.
GAS REGULATING VALVE.
APPLICATION FILED FEB. 24, 1911.
1,007,664.
Patented Nov. 7, 1911.
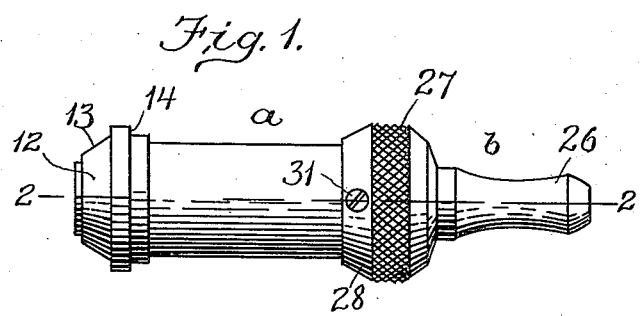
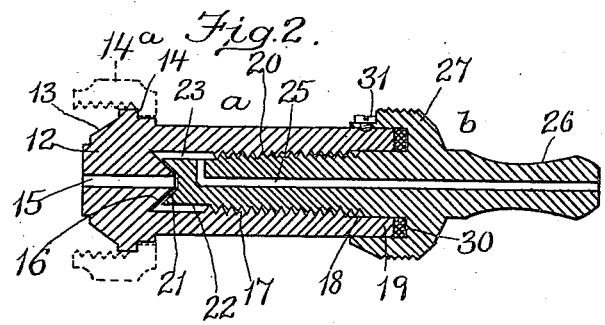
Witnesses:
Inventor:
Arthur G. Baker

UNITED STATES PATENT OFFICE.

ARTHUR G. BAKER, OF CAMBRIDGE, MASSACHUSETTS, ASSIGNOR, BY MESNE ASSIGNMENTS, TO D. E. BIGELOW, OF NEW YORK, N. Y.

GAS-REGULATING VALVE.

1,007,664.  Specification of Letters Patent.  Patented Nov. 7, 1911.

Application filed February 24, 1911. Serial No. 610,659.

*To all whom it may concern:*

Be it known that I, ARTHUR G. BAKER, of Cambridge, in the county of Middlesex and State of Massachusetts, have invented certain new and useful Improvements in Gas-Regulating Valves, of which the following is a specification.

This invention has for its object to provide a gas regulating valve adapted to be applied to the outlet of a gas storage tank of the kind employed on motor vehicles to supply gas to headlights, the construction of the valve being such that it is adapted to be easily and conveniently adjusted to regulate the pressure of the gas at the headlight burner and to maintain the pressure at the exact degree desired.

Of the accompanying drawings which form a part of this specification, Figure 1 represents a side view of a gas regulating valve embodying my invention; Fig. 2 represents a section on line 2—2 of Fig. 1.

Similar reference characters indicate the same or similar parts in all the figures.

My improved valve is composed of a female member $a$ having a coupling head, a valve seat and a gland, and a male member $b$ having a valve, a stuffing box, and a nipple to engage a flexible gas conducting tube, the threads of the female and male members causing an endwise movement of the male member when the latter is rotated, and a movement of the valve toward and from its seat to regulate the gas pressure or entirely shut off the flow of gas.

12 represents the coupling head of the female member, said head having a tapered face 13 adapted to enter a socket surrounding the outlet of a storage tank, and a shoulder 14 adapted to engage the flange of a coupling nut 14$^a$ which detachably secures the member $a$ to a coupling member on the gas tank. The head 12 has a relatively small longitudinal duct 15 which terminates in the apex of a conical face 16 forming a valve seat at the inner end of a longitudinal chamber formed by the tubular portion of the member $a$. The wall of said chamber has an internally screw-threaded portion 17, and the outer end of the chamber has a smooth surfaced enlargement 18 which is concentric with the cylindrical external surface of the member $a$ and forms the inner surface of an annular gland 19. The male member $b$ has an external screw-threaded portion 20, a conical end recess 21 conforming to the valve seat 16, and constituting not only a valve adapted to close on the seat 16, but also a gas deflector adapted, when separated from the seat, to deflect backwardly the stream of gas and retard its flow by friction. The periphery of the male member adjoining the valve 21 has a reduced portion 22 forming the inner wall of an annular gas duct 23.

25 represents a duct extending through one side of the reduced portion 22 and longitudinally through the male member $b$ to its outer end which is formed as a nipple 26 adapted to enter a flexible gas tube. The male member $b$ is provided with an enlargement 27 having an annular flange 28 which overhangs a smooth surfaced peripheral portion of the male member. Said enlargement and the flange 28 constitute the bottom and outer wall of a stuffing box, of which the periphery of the male member forms the inner wall, said stuffing box being provided with a rubber packing ring 30. The gland 19 has a sliding fit in the stuffing box. The enlargement 28 has a milled or knurled periphery and constitutes a hand grip by which the male member may be rotated to adjust the valve and deflector 21.

It will now be seen that the valve 21 may be adjusted and held at any desired distance from the seat 16 to cause any desired degree of pressure and may be closed on the seat to shut off the flow of gas, the enlargement 27 permitting the adjustment of the male member without the employment of a wrench. The flange 28 is provided with a set screw 31 which may be set up against the periphery of the female member $a$ to lock the male member at any desired adjustment.

The packing ring 30 may be omitted if desired, in which case the enlargement 27 with its flange 28 will have no function as a stuffing box, but will serve merely as a hand grip, and, with the set screw 31, as a means for locking the male member and its valve at the desired adjustment.

I claim:—

1. A gas reducing valve comprising a female member having a coupling head at one end, a gland at the other end, and an internally threaded chamber extending through the gland and having a conical inner end forming a valve seat, the coupling head being provided with a relatively small duct extending through the apex of the valve seat, and a male member having an external thread engaging the internal thread of said chamber, a recessed end conforming to the conical valve seat and constituting both a valve and a gas deflector, a flanged enlargement constituting a hand grip and also the outer wall and bottom of a stuffing box which receives the said gland, and a nipple adapted to engage a gas tube, the male member being provided with a reduced inner end portion forming the inner wall of an annular duct adjacent to the valve, and with a longitudinal duct communicating with said annular duct and extending through said nipple.

2. A gas regulating valve comprising an internally threaded female member one end of which is adapted to be coupled to a storage tank and provided with a relatively small duct terminating in a conical valve seat within the member, while the other end is formed as a gland, and an externally threaded male member formed at one end to engage a gas tube and at its other end as a recessed gas deflector and valve conforming to said seat, the male member having a flanged enlargement forming a hand grip and also the outer wall and bottom of a stuffing box which receives said gland, the flange of said enlargement being provided with means whereby it may be locked against rotative movement on the female member to hold the valve at a given adjustment.

In testimony whereof I have affixed my signature, in presence of two witnesses.

ARTHUR G. BAKER.

Witnesses:
 C. F. BROWN,
 P. W. PEZZETTI.